May 28, 1963 A. B. MAYFIELD ETAL 3,091,132
VARIABLE RATIO DRIVE MECHANISM
Filed Aug. 11, 1958
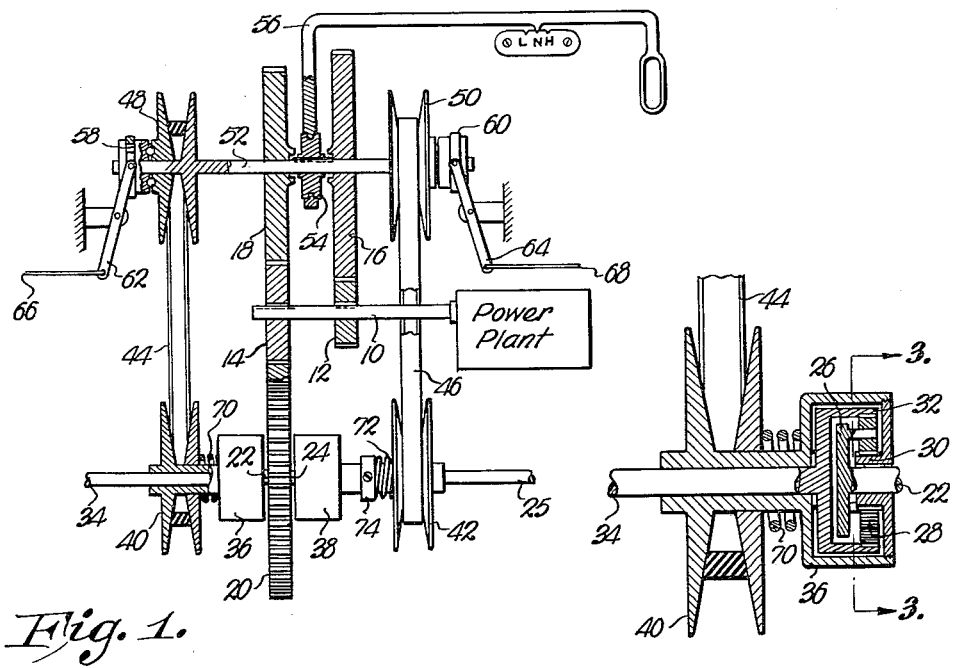
*Fig. 1.*
*Fig. 2.*
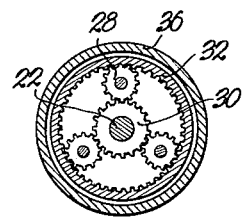
*Fig. 3.*
INVENTORS.
Alfred B. Mayfield
Marvin C. Darling
BY
ATTORNEY.

United States Patent Office 3,091,132
Patented May 28, 1963

3,091,132
VARIABLE RATIO DRIVE MECHANISM
Alfred B. Mayfield, Halstead, and Marvin C. Darling, Burton, Kans., assignors to Davis Manufacturing, Inc., Wichita, Kans., a corporation of Kansas
Filed Aug. 11, 1958, Ser. No. 754,441
3 Claims. (Cl. 74—722)

This invention relates to power transmitting mechanisms for vehicles and more particularly to such mechanisms whereby turning power in the form of a shaft from a power source can be changed with respect to speed, direction of rotation and torque whereby to control the speed and direction of movement of a vehicle.

It is a primary object of this invention to make conversions of power in a smooth and stepless manner while the transmission is running. To accomplish this object turning power is directed into the transmission by a primary input shaft and is taken from the transmission by one or more output shafts. The power as delivered by the output shaft or shafts is in a different form than the power applied at the input shaft, and also the power delivered by the output shaft or shafts may be smoothly and gradually changed with respect to speed, direction of rotation or torque without any appreciable change in the form or amount of power being applied to the input shaft.

A further object of this invention is to provide an infinitely variable ratio transmission whereby any reasonable ratio, either forward or reverse, between the input shaft and output shaft or shafts may be obtained.

As the value and usefulness of any torque conversion unit depends primarily upon its ability to carry power, a further aim of this invention is to provide a transmission equipped with the necessary mechanical components to greatly increase its load carrying capacity.

A yet further object of this invention is to provide a transmission having an input shaft, and operably coupled with this shaft two distinct power trains, namely a primary power train or route and a secondary power train or route. These two power trains carry the power delivered into the transmission by the input shaft to a differential gearing arrangement in the form of a planetary gear composed of three separate elements, two of said elements deriving their power from the primary and the secondary power train respectively. The third element of the planetary gear is coupled directly to the output shaft of the transmission and derives its turning power from the other two elements of the planetary gear. The primary power train drives the gear element upon which is carried the heaviest load, said power train being of a definite ratio type, and the speed of the input shaft being in direct proportion to the speed of the planetary gearing element driven by the primary drive train. The secondary power train is not of the definite ratio type, but rather consists of a variable ratio friction device in the form of an endless flexible member or belt running over pulleys of variable diameters, said pulleys being coupled with a gearing arrangement which can drive the variable friction device at two definite, different speed ratios with respect to the input shaft speed. There is also provided means for shifting said gearing arrangement from one ratio to another or completely breaking or disengaging the gears, thus leaving no mechanical driving connection between the input shaft and the variable friction device. Thus, it is possible, by varying the speed of the second planetary gearing element relative to the speed of the primary planetary gearing element, to make the third planetary gearing element turn at either forward or reverse speeds. It is also possible by disengaging the gears of the secondary power train to place the complete transmission in neutral, thus making it possible for the input and output shafts to be turned independently of one another.

Another object of the present invention is to provide, within the secondary power train of the transmission, a plurality of variable friction devices so as to increase the ratio flexibility between the input shaft and the secondary gearing element.

A further object of the subject invention is to provide a transmission which may be used as a dual transmission, with two output shafts, or a single transmission with one output shaft each. When coupled with two output shafts the transmission assembly may be installed on a motor vehicle in such a manner that each of the two output shafts powers a drive wheel on one side of the vehicle and thus the vehicle may be steered by controlling the speed of one output shaft relative to the other. The single transmission may be installed on a motor vehicle so as to power the drive wheels of such vehicle through a conventional differential housing and steering may be effected through auxiliary wheels in a conventional manner. There is also included within the single transmission a means of stopping the secondary element of the planetary gearing and thus obtaining a positive gear ratio between the input and output shafts for high speed travel.

A further object of this invention is to provide a break, or neutral, in the secondary power train on both the single and the dual transmission, whereby to allow the input shaft to be turned independently of the output shaft regardless of the positions of the variable friction device. On both the single and the dual transmissions such a break allows the output shaft to be turned independently of the input shaft and thus the variable friction device may be brought to the ratio desired should towing the vehicle to start the engine prove necessary. A vehicle equipped with the dual transmission when in neutral position may be towed and still maintain its steering qualities, even though there is no mechanical connection between the engine and the drive wheel on either side.

Another object is to provide gearing means along the secondary power train whereby to add to the ratio variations offered by the variable friction device and thus allow a broader change in drive ratios between the input and output shaft than could be obtained with the variable friction drive along.

Further objects of the invention will become apparent from the following description taken in connection with the accompanying drawing in which:

FIGURE 1 is a fragmentary, diagrammatic view of one form of the variable ratio drive mechanism embodying the instant invention;

FIG. 2 is an enlarged fragmentary, cross-sectional view substantially centrally through a planetary gearing assembly such as shown in FIG. 1; and FIG. 3 is a cross-sectional view taken on line 3—3 of FIG. 2.

It is seen from a study of the drawings that the instant invention has, as an essential part thereof, a driving or input shaft coupled with a power source and at least one driven, or output shaft. Operably coupled with each driven shaft is a transmission mechanism comprising differential or planetary gearing, as best shown in FIG. 2 and 3. Also operably coupled with the output shaft and the planetary gearing mechanism are means to vary the speed of rotation of one of the components of the planetary gear assembly, such means constituting variable speed pulleys and belts. Thus, it is seen that there is a primary power train from the input shaft to the driven shaft and a secondary variable power train from the input shaft to the planetary gearing assembly and the driven shaft. Incorporated within the secondary power train is a gear shift or break which offers positive ratio changes in said power train and also the advantages of a neutral position.

Referring now to FIG. 1, a diagrammatic view of the instant invention, it is seen that there is shown a power plant, preferably in the form of an internal combustion engine or the like, which power plant drives an input or driving shaft 10. Pinions 12 and 14 on drive shaft 10 rotate therewith, pinion 12 driving gear 16 and pinion 14 driving gears 18 and 20. Gear 20 has affixed thereto stub shafts 22 and 24 upon which are rigidly mounted carriers for a plurality of planet gears. Inasmuch as both planetary gearing assemblies are identical, only one will be described, reference being made to FIG. 2 which clearly illustrates such assembly. As indicated, stub shaft 22 has mounted thereon a carrier 26 for a plurality of planet gears 28 which gears mesh with a sun gear 30 and an internally toothed ring gear 32. Ring gear 32 is rigidly affixed to output shaft 34. Sun gear 30 is an integral part of a case 36 which surrounds the planetary gearing assembly and is rotatable on shafts 34 and 22. An identical case 38 surrounds the planetary gearing assembly coupled with shaft 24 and output shaft 25.

Rotatable with cases 36 and 38 respectively are pulleys 40 and 42. Interconnected with said pulleys 40 and 42 by belts 44 and 46 respectively are pulleys 48 and 50, carried by jack shaft 52 upon which are mounted gears 16 and 18.

Keyed to shaft 52 is a clutch disc 54 which is rotatable with shaft 52 and axially slidable thereon to selectively engage gears 16 or 18 in response to actuation of a shifting lever 56 which is operably coupled with disc 54. It is to be noted that gears 16 and 18 and pinion gears 12 and 14 which engage one another respectively are of varying diameters and thus make possible two distinct gear ratios in the nature of a low and high gear when coupled with shaft 52 by means of disc 54. The high range offers speeds from zero to full forward, the low range offers moderate reverse and forward speeds. FIG. 1 shows the transmission in a neutral position.

Also carried by shaft 52 adjacent each of pulleys 48 and 50 are means for varying the diameter of said pulleys and the speed of the belts 44 and 46 associated therewith. Such means are in the form of slidable sleeves 58 and 60 which are reciprocable along shaft 52 by pivoted arms 62 and 64 respectively, said arms being movable by cables 66 and 68 respectively.

Sleeves 58 and 60 act against the outer sections of pulleys 48 and 50 to vary the diameter thereof and thus vary the speed of belts 44 and 46, cases 36 and 38 and the sun gears 30 forming a part thereof. Cooperating with the means for varying pulleys 48 and 50 are additional means for simultaneously varying the diameter of pulleys 40 and 42. Such last mentioned means are in the form of springs 70 and 72 coiled about output shafts 34 and 25 respectively and disposed so as to resiliently bias the innermost sections of pulleys 40 and 42 outwardly. Spring 70 is maintained in such a position by case 36, and spring 72 is held in position by a collar 74. Thus, it is seen that when sleeves 58 and 60 are adjusted to vary the diameter of pulleys 48 and 50, such movement causes a self adjustment of pulleys 40 and 42 as a result of springs 70 and 72 acting thereon.

From the foregoing it is apparent that there is presented a primary power train from the power plant through shaft 10, pinion gear 14, gear 20, stub shafts 22 and 24 and to carrier 26. As is best seen in FIG. 2, shaft 22, which is driven by the input shaft 10 through the means above mentioned, drives planet gears 28 at a relatively constant speed to that of the input shaft 10.

A secondary power train passes from the input shaft 10 through either pinion gear 12 or 14 and gear 16 or 18, depending upon the ratio desired, through jack shaft 52 and thence pulleys 48 and 50, belts 44 and 46, pulleys 40 and 42 to cases 36 and 38 and thus to the sun gears integral with said cases. As shown in FIG. 2, sun gear 30 is integral with the case and rotates therewith about shafts 22 and 34. The variable pulleys 48 and 50 with belts 44 and 46 make it possible to vary the speed of the sun gears with respect to the speed of the planet gear carrier and thus obtain an infinitely variable ratio transmission assembly.

Since the ring gear 32 and thus output shaft 34 to which it is rigidly affixed derive their speed and torque from the sun and planet gears, it is seen that with carrier 26 turning at a constant speed, the speed and torque of the output shafts 34 and 25 may be varied by varying the speed of the sun gears 30. Thus, to effect forward movement of the vehicle when it is in gear, the speed of rotation of the sun gears is decreased by operating variable pulley and belt assemblies 40—50 by means of control cables 66 and 68. Conversely, to effect reverse travel from a standstill position when the vehicle is in gear the speed of rotation of the sun gears 30 is increased by suitably varying said assemblies 40—50 by control cables 66 and 68.

As is seen in FIG. 1 a break in the secondary power train can be created by shifting lever 56 to a neutral position and thus allowing pulleys and belts 40—50 to turn freely without applying any appreciable torque to the wheels of the vehicle. Such a break in the power train is particularly useful when the vehicle becomes stalled or stuck against an obstruction with the transmission in gear. As the variable friction device assemblies 40—50 would be stopped in such a position as to give forward motion and could not be varied to return the ratio to produce an output speed of 0 m.p.h. without turning the same, it would be impossible to start the engine unless the wheels of the vehicle were turned. Such a situation would offer no difficulty if the vehicle were equipped with the present invention, for the secondary power train could simply be placed in a neutral position and the engine started, thus turning the variable friction devices and allowing its ratio to be changed without the wheels being turned.

It is also anticipated that the variable friction devices 40—50 will be used to steer the vehicle by varying the speed of one output shaft relative to the other by means of cables 66 and 68 varying the speed of the sun gears 30. Thus, the vehicle can be pushed or towed, and if the secondary power train is in a neutral position, it may be steered by cables 66 and 68.

Having thus described the invention, what is claimed as new and desired to be secured by Letters Patent is:

1. A variable ratio drive mechanism including, in combination, a power plant having a driving shaft; a pair of driven shafts; a primary power transmission train operably interconnecting said driving shaft and said driven shafts; secondary power transmission trains operably interconnecting said driving shaft and said driven shafts; planetary gear assemblies each having a sun gear, planet gears and a ring gear and coupling said power transmission trains with said driven shafts respectively, the sun gears of each of said planetary gear assemblies being driven by a corresponding secondary power transmission train, the planet gears of each of said planetary gear assemblies being driven by the primary power transmission train, and the ring gear of each assembly being rigidly mounted on the corresponding driven shaft and deriving its speed and torque from the sun and planet gears of its assembly; a clutch interposed in said secondary power transmission train for rendering the same inoperable; belt and variable pulley assemblies within each of said secondary power trains for varying the speed thereof; and manually manipulable control means coupled with the variable pulleys of said belt and pulley assemblies for altering the effective size of the pulleys.

2. A variable ratio drive mechanism as set forth in claim 1 where, in each assembly, said planet gears are driven by the power plant at a constant speed, the sun gears are driven by said power plant at variable speeds, and the ring gear derives its power and direction of rotation from said planet gears.

3. A variable ratio drive mechanism including, in combination, a power plant having a driving shaft; a gear train operated by said driving shaft; planetary gear assemblies operably coupled with said gear train; a pair of driven shafts each operably interconnected with said gear train by one of said planetary gear assemblies; a jack shaft within said gear train and having gears of said train rotatable thereabout; variable diameter pulleys on said jack shaft and said driven shafts respectively; belts interconnecting said pulleys, said pulleys on the driven shafts each being coupled with a corresponding planetary gear assembly; control means for varying the effective diameter of said pulleys whereby to control the speed and direction of rotation of said driven shafts; and a clutch carried by said jack shaft and selectively engageable with the gears carried by said jack shaft whereby to vary the ratio of said gear train.

References Cited in the file of this patent

UNITED STATES PATENTS

| | | |
|---|---|---|
| 1,702,627 | Bronander | Feb. 19, 1929 |
| 1,891,208 | Schuetz | Dec. 13, 1932 |
| 2,247,153 | Ewart | June 24, 1941 |
| 2,509,685 | Hughes | May 30, 1950 |
| 2,615,350 | Wahlberg | Oct. 28, 1952 |
| 2,754,691 | May | July 17, 1956 |
| 2,760,386 | Southwick | Aug. 28, 1956 |
| 2,889,716 | Doty | June 9, 1959 |
| 2,916,949 | Smith et al. | Dec. 15, 1959 |